United States Patent [19]

Sherrod

[11] 4,282,071
[45] Aug. 4, 1981

[54] ANHYDROUS SEPARATION OF VOLATILE ALUMINUM CHLORIDE COMPLEX FROM AN ETHYLBENZENE PRODUCTION STREAM BY DISTILLATION

[75] Inventor: Fred A. Sherrod, Freeport, Tex.

[73] Assignee: The Dow Chemical Company, Midland, Mich.

[21] Appl. No.: 790,517

[22] Filed: Apr. 25, 1977

[51] Int. Cl.³ .............................................. B01D 3/34
[52] U.S. Cl. ...................................... 203/38; 203/62; 203/63
[58] Field of Search ............................ 203/38, 62, 63; 260/674 A

[56] References Cited

U.S. PATENT DOCUMENTS 3,342,885  9/1967  Hutson, Jr. ...................... 260/674 A Primary Examiner—Hiram Bernstein
Attorney, Agent, or Firm—M. W. Barrow

[57] ABSTRACT

Process for changing the volatile aluminum chloride complex contained in an ethylbenzene production stream into a non-volatile, aluminum chloride product of a nature such that the ethylbenzene in the stream can be separated from the aluminum chloride catalyst by flash distillation. Conversion of the volatile aluminum chloride complex to a non-volatile aluminum chloride product is accomplished by adding selected alcohols, aldehydes, or ketones to the ethylbenzene stream.

26 Claims, 1 Drawing Figure

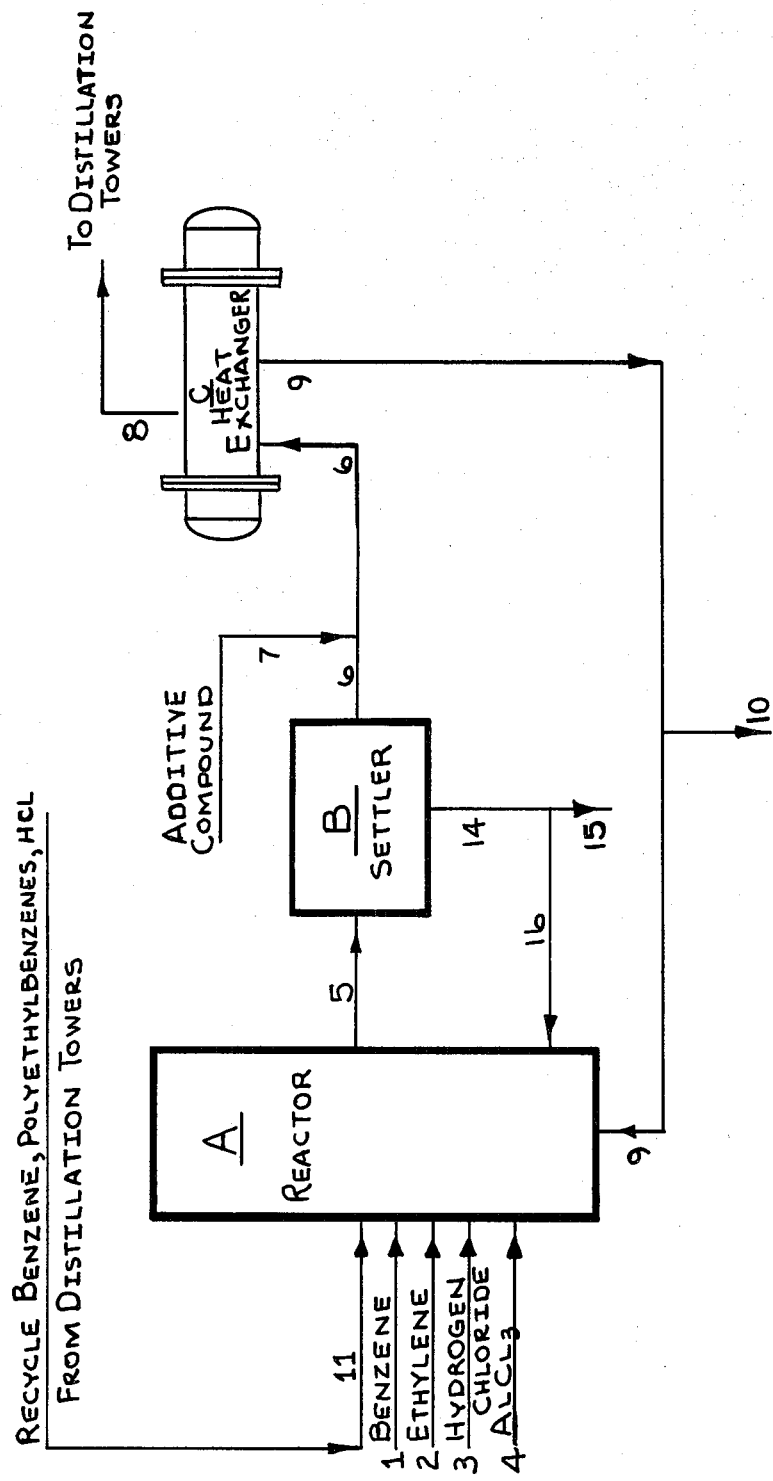

ANHYDROUS SEPARATION OF VOLATILE ALUMINUM CHLORIDE COMPLEX FROM AN ETHYLBENZENE PRODUCTION STREAM BY DISTILLATION

BACKGROUND OF THE INVENTION

The preparation of ethylbenzene by the reaction of benzene with ethylene in the presence of aluminum chloride and hydrogen chloride is well known. The aluminum chloride and hydrogen chloride react with alkylated benzenes in the reaction mixture to form complex, hereafter referred to as aluminum chloride complex, or simply, complex. Much of this complex can be removed by merely allowing it to settle out. However, all the complex cannot be isolated from the reaction mixture because it is partially soluble, and therefore, remains in the process stream coming from the settler. Some complex also remains in the process stream due to entrainment (dispersed as tiny droplets). Removal of this remaining dissolved and entrained complex has been accomplished by several methods. Washing the reaction mixture with water is the common industrial method of removing this remaining aluminum chloride complex. However, this is undesirable because water is introduced into the stream, which necessitates a costly drying process. This drying is necessary in commercial operations using recycle, because a substantial portion of the reactor stream is unreacted benzene, which must be dry before it can be recycled to the reactor.

U.S. Pat. No. 3,342,885 teaches the formation of an aluminum chloride complex precipitate in the reaction mixture of some reactions catalyzed by AlCl$_3$ by the addition of certain oxygen-containing agents, and then filtering this reaction mixture to remove the precipitated aluminum chloride. Removal by filtration involves batch-type process operations in commercial ethylbenzene plants, which even if a suitable precipitates would form, would be undesirable compared to the accepted continuous method of water-washing.

An anhydrous, economically feasible method wherein the ethylbenzene product could be substantially separated from the aluminum chloride complex remaining in the stream following a settling separation, would be highly advantageous. Distillation was investigated as an anhydrous means of separating the ethylbenzene product from the aluminum chloride complex. In these investigations it was discovered that aluminum chloride complex, itself, is volatile, and highly efficient fractional distillation is required to separate the ethylbenzene from the complex. Because the method of fractional distillation would be expensive due to the large amount of reflux required, a method in which the separation could be attained by a flash distillation with little or no reflux would be more advantageous.

SUMMARY OF THE INVENTION

The present invention is a process for the anhydrous separation of the volatile, organic aluminum chloride complex from the volatile ethylbenzene both of which are contained in an ethylbenzene production stream, said process comprising:

a. adding to the production stream a compound capable of transforming the volatile aluminum chloride complex into an aluminum chloride product which is essentially non-volatile at the temperature and pressure at which the ethylbenzene will distill; and b. distilling the production stream at a temperature sufficient to cause the volatilization of the ethylbenzene.

BRIEF DESCRIPTION OF THE DRAWING

The drawing is a simplified schematic flow diagram of a portion of an ethylbenzene production process in which the method of this invention may be utilized.

DETAILED DISCUSSION OF THE INVENTION

Feed to reactor A is through lines 1, 2, 3, 4, 9, 11 and 16.

In reactor A ethylbenzene is formed from the reaction of benzene with ethylene and by the transalkylation of polyethylbenzene, in the presence of volatile aluminum chloride complex. This complex is formed from the reaction of aluminum chloride, hydrogen chloride, and alkylated benzenes. Besides the aluminum chloride complex and ethylbenzene, the production stream from reactor A also contains unreacted benzene, hydrogen chloride, diethylbenzene, triethylbenzene, some higher ethylated benzenes, and byproducts (about 1 wt. % of the stream) such as toluene, diphenylethanes, propylbenzenes, and butylbenzenes. The diethylbenzene, triethylbenzene, and higher ethylated benzenes are herein referred to as polyethylbenzenes. This reaction mixture passes from reactor A to settler B via line 5. In settler B the stream is allowed to remain stationary for a sufficient time to allow that portion of the aluminum chloride complex which will gravitationally settle out of the mixture to so settle out.

The settled aluminum chloride complex is removed from settler B via line 14. This complex can be recycled back into reactor A through lines 14 and 16, or it can be removed totally, or partially, from the system via lines 14 and 15. Recycle is preferable.

As the reaction mixture passes through line 6 after leaving settler B, an additive compound is injected into the reaction mixture via line 7. This additive is one which will cause the volatile aluminum chloride complex to change into an aluminum chloride product which is essentially non-volatile at the temperatures necessary to vaporize substantially all the ethylbenzene in the reaction mixture. Without the addition of the additive a significant amount of aluminum chloride complex also distills over and causes corrosion and plugging problems in the subsequent distillation towers. Preferably the compound which is added to the stream is one which transforms the volatile aluminum chloride complex into an aluminum chloride product which is not only essentially nonvolatile, but is one which is also substantially soluble during the ethylbenzene distillation.

In flash distiller C, heat is supplied to the production stream to distill the ethylbenzene contained therein. The non-volatile aluminum chloride product is also still present in the production stream. It is understood that more of the production stream is distilled than just the ethylbenzene in flash distiller C.

The above distillation is usually carried out at atmospheric pressure in a temperature range of from about 90° C. to about 200° C., preferably from about 110° C. to about 160° C. Of course, these temperature ranges change when the distillation is carried at pressures other than atmospheric pressure. The operation is not restricted to atmospheric pressure. From flash distiller C the volatilized portion of the reaction mixture passes overhead via line 8 to distillation towers. This distillate is comprised of unreacted benzene, ethylbenzene, polyethyl benzenes, hydrogen chloride, and some of the byproducts.

In these distillation towers, this distillate of flash distiller C is further distilled to separate the ethylbenzene as the finished product of the plant. From these distillation towers unreacted benzene, polyethylbenzenes, hydrogen chloride, and some byproducts are separated and recycled back as feed to reactor A. This recycle is shown in the drawing as being accomplished through line 11.

The liquid bottom of flash distiller C comprising the non-volatile aluminum chloride product flows out of flash distiller C through line 9. This residue can be recycled as feed to reactor A through line 9, or totally removed from the system through line 10, or split so that a portion passes through both lines. The additives included within the present invention are those which form a non-volatile, preferably soluble, product with aluminum chloride at the temperature required for vaporization of the ethylbenzene in the reaction mixture. These are secondary alcohols, tertiary alcohols, ketones, aldehydes and mixtures thereof.

Specific examples of the additives which can be used in the practice of this invention are cyclohexanol, acetone, tert-butyl alcohol, sec-butyl alcohol, tert-amyl alcohol, methyl ethyl ketone, ethyl propyl ketone, isopropanol, and cyclohexanone. Cyclohexanol, acetone, and cyclohexanone are the more preferable additives with cyclohexanol being the most preferred.

The mole ratio of the alcohol or ketone to the amount of aluminum chloride complex present is not critical. The exact amount required is dependent on the nature of the complex, which is highly variable. In commercial operations a substantial portion of the aluminum chloride is often present as non-active, non-volatile complex and does not require treatment. The amount of volatile complex present, as determined by how much distills when no additive is added, requires a 1:1 mole ratio to prevent substantially no vaporization of complex. A greater amount of additive is acceptable, but usually not necessary. Less alcohol, aldehyde, or ketone than a 1:1 mole ratio is effective in preventing some of the volatile complex from distilling. Acceptable mole ratios of alcohol, aldehyde, or ketone to volatile complex present are from about 0.01:1 to about 10:1. Preferably the mole ratio should be about 1:1.

To determine the effectiveness of this invention the following examples were run at atmospheric pressure. Example A was run without the addition of a compound to change the volatile aluminum chloride complex contained in a reaction mixture into an essentially non-volatile aluminum chloride product. Examples 1-6 were run using the process of this invention. Thus the purpose of Example A is base line for which the effectiveness of the process of this invention, as exemplified in Examples 1-6, can be compared. The reaction mixtures used were obtained from an ethylbenzene production stream made in a system like the above described system given for the drawing. Except for Examples 5 and 6, the reaction mixtures were comprised of benzene (about 59 wt. %) ethylbenzene (about 33 wt. %), higher polyethylbenzenes (about 8wt.%), other products of such a reaction (about 1 wt.%), and about 1000 parts per million (ppm) aluminum. The aluminum was present in the reaction mixtures as aluminum chloride complex. The reaction mixtures used in Examples 5 and 6 were comprised of benzene (about 44 wt.%), ethylbenzene (about 43 wt.%), higher polyethylbenzenes (about 8 wt.%), byproducts (about 1 wt.%), and about 1000 ppm aluminum chloride complex.

EXAMPLE A

A glass, batch distillation system for operation under a nitrogen atmosphere was assembled utilizing a 1-liter round-bottom flask equipped with a 1-inch diameter by 12-inch long Vigreux column. The system was further equipped with heating mantle, magnetic stirrer, overhead water condenser, receiver, and thermometers for determination of pot and overhead temperatures. The Vigreux column was insulated to minimize internal reflux. Using this system, 900 ml. of reaction mixture was distilled at atmospheric pressure. A total of seven cuts were collected for a typical analysis as shown in Table I. The aluminum was present in the distillate as the distinctive yellow-red complex typical of freshly prepared aluminum chloride-ethylated benzene complex.

TABLE I

| Cut No. | Distillate ml | Head Temperature Range, °C. | Pot Temperature Range, °C. | Al ppm |
| --- | --- | --- | --- | --- |
| 1 | 410 | 70-100 | 85-110 | 1.2 |
| 2 | 97 | 100-110 | 110-120 | 2.4 |
| 3 | 57 | 110-120 | 120-130 | 9.0 |
| 4 | 45 | 120-130 | 130-139 | 15.4 |
| 5 | 53 | 130-140 | 139-148 | 60 |
| 6 | 73 | 140-150 | 148-158 | 124 |
| 7 | 49 | 150-160 | 158-173 | 202 |

EXAMPLE 1

To 900 ml. of reaction mixture was added 0.5 grams of cyclohexanol dried with 5A molecular sieve. The mixture was distilled in the system described above. A distillate cut taken between the overhead temperature range of 145°-146° C. contained only 1.4 ppm Al. A second distillate cut taken between the overhead temperature range of 145°-156° C. contained only 4.8 ppm Al.

EXAMPLE 2

Nine hundred milliliters (900 ml) of reaction mixture was distilled as described in Example A. When the aluminum concentration in the distillate reached about 15 ppm, 0.6 grams of cyclohexanone was added to the pot. Distillation was continued until only about 100 ml of pot residue remained. The distillate, collected in several cuts, was analyzed, and the aluminum concentration remained less than 10 ppm in each distillation cut.

EXAMPLE 3

The procedure of Example 2 was followed with 1.0 gram of tert-butyl alcohol. The aluminum concentration in each of the distillation cuts again remained less than 10 ppm.

EXAMPLE 4

The procedure of Example 2 was followed with 1.0 gram of tert-amyl alcohol. Again the aluminum concentration in each of the distillation cuts remained less than 10 ppm.

EXAMPLE 5

An ethylbenzene production stream containing 800 ppm aluminum (as aluminum chloride complex) was fed to the shell side of a boiling-bed heat exchanger at a rate of 190,000 lbs./hr. About 90% of the stream was vaporized overhead at about 125° C. and 10% taken out the bottom as liquid. The overhead vapor stream contained 260 ppm aluminum. To the feed stream was added 0.2 gallons/minute of acetone. The aluminum concentration in the overhead dropped to 27 ppm. No solids were detected in the liquid bottoms stream to cause plugging problems.

EXAMPLE 6

The procedure of Example 5 was followed using cyclohexanol. Before cyclohexanol addition the overhead vapor contained 270 ppm aluminum and 9.8 ppm iron chloride. A cyclohexanol addition rate of 0.33 gallons/minute reduced the aluminum concentration in the overhead vapor to 2.8 ppm and the iron concentration to 0.26 ppm. The cyclohexanol feed rate was dropped to 0.17 gallons/minute. The aluminum concentration in the overhead vapor increased to 7.9 ppm, and iron concentration increased to 0.51 ppm. No problem with solids was encountered.

It has also been discovered, as illustrated in Example 6, that the additive compounds used in this invention for changing volatile aluminum chloride complex, contained in an ethylbenzene production stream, into an essentially non-volatile aluminum chloride product at the temperature at which ethylbenzene will distill, will also substantially reduce the volatility of any iron chloride formed in the reaction mixture. Most commercial reactors and other apparatus used in commercial ethylbenzene production systems have many large surfaces containing iron which contacts the ethylbenzene stream. This stream picks up small quantities of iron from these surfaces, and this iron reacts with the hydrogen chloride contained in the stream to form iron chloride. It is advantageous to have this iron chloride removed from the system.

What is claimed is:

1. A process for the anhydrous separation of the volatile, organic aluminum chloride complex from ethylbenzene both of which are contained in an ethylbenzene production stream, said process comprising:
    a. adding to the production stream a compound capable of transforming the volatile aluminum chloride complex into an aluminum chloride product which is essentially non-volatile at the temperature and pressure at which the ethylbenzene will distill; and
    b. distilling the production stream at a temperature sufficient to cause the volatilization of the ethylbenzene.

2. The process of claim 1 wherein the compound added to the reaction mixture is selected from the groups consisting of secondary alcohols, tertiary alcohols, ketones, aldehydes, and mixtures thereof.

3. The process of claim 1 wherein the compound is selected from the group consisting of cyclohexanol, cyclohexanone, acetone, tertiary amyl alcohol, tertiary butyl alcohol, and mixtures thereof.

4. The process of claim 1 wherein the compound is cyclohexanol.

5. The process of claim 1 wherein the temperature at about atmospheric pressure is from about 90° C. to about 200° C.

6. The process of claim 1 wherein the temperature at about atmospheric pressure is from about 110° C. to about 160° C.

7. The process of claim 1 wherein the distillation is carried out at a pressure other than atmospheric.

8. The process of claim 1 wherein the ethylbenzene production stream also contains unreacted benzene, hydrogen chloride, diethylbenzene, triethylbenzene, higher ethylated benzenes, and byproducts.

9. The process of claim 1 wherein the mole ratio of the additive compound to the volatile aluminum chloride complex present in the stream is from 0.01:1 to about 10:1.

10. A process for the anhydrous separation of voaltile iron chloride contained in an ethylbenzene production stream, which process comprises:
    a. adding to the production stream a secondary alcohol, a tertiary alcohol, a ketone, an aldehyde, or mixtures thereof to substantially reduce the volatility of the iron chloride at the temperature required to distill substantially all of the ethylbenzene; and
    b. distilling the reaction mixture at a temperature sufficient to cause the volatilization of substantially all of the ethylbenzene.

11. The process of claim 10 wherein the distillation temperature at about atmospheric pressure is from 90° C. to about 200° C.

12. The process of claim 10 wherein the distillation temperature at about atmospheric pressure is from about 110° C. to about 160° C.

13. The process of claim 10 wherein the secondary alcohol is cyclohexanol, the tertiary alcohol is tertiary amyl alcohol or tertiary butyl alcohol, and the ketone is cyclohexanone or acetone.

14. The process of claim 10 wherein the secondary alcohol is cyclohexanol.

15. A process for the anhydrous separation of both the volatile aluminum chloride complex and volatile iron chloride from the ethylbenzene contained in an ethylbenzene production stream, said process comprising:
    a. adding to the production stream a compound selected from the group consisting of secondary alcohols, tertiary alcohols, ketones, aldehydes, and mixtures thereof to transform both the volatile aluminum chloride complex and the volatile iron chloride, respectively, into an essentially non-volatile aluminum chloride product and into an essentially non-volatile iron chloride product at the temperature and pressure at which the ethylbenzene will distill; and
    b. distilling the production stream at a temperature sufficient to cause the substantial volatilization of the ethylbenzene.

16. The process of claim 15 wherein the distillation temperature at about atmospheric pressure is from about 90° C. to about 200° C.

17. The process of claim 15 wherein the distillation temperature at about atmospheric pressure is from about 110° C. to about 160° C.

18. The process of claim 15 wherein the secondary alcohol is cyclohexanol, the tertiary alcohol is tertiary amyl alcohol or tertiary butyl alcohol, and the ketone is cyclohexanone or acetone.

19. The process of claim 15 wherein the secondary alcohol is cyclohexanol.

20. The process of claim 15 wherein the essentially non-volatile aluminum chloride product formed from the volatile aluminum chloride complex is also substantially soluble.

21. A process for the anhydrous separation of ethylbenzene from the aluminum chloride contained in an ethylbenzene production stream, which process comprises:

(a) adding to the production stream a compound selected from the group consisting of acetone, cyclohexanol, and mixtures thereof in order to transform the volatile aluminum complex to an aluminum chloride product which is both essentially non-volatile and substantially soluble at the temperature required to distill substantially all of the ethylbenzene; and (b) distillating the reaction mixture at a temperature sufficient to cause the volatilizing of substantially all of the ethylbenzene.

22. The process of claim 21 wherein the mole ratio of the compound added in step (a) to the volatile aluminum chloride present in the stream is from about 0.01:1 to about 10:1.

23. The process of claim 21 wherein the temperature range at about atmospheric pressure is from about 90° C. to about 200° C.

24. The process of claim 21 wherein the temperature at about atmospheric pressure is from about 110° C. to about 160° C.

25. The process of claim 21 wherein the distillation is carried out at pressures other than atmospheric.

26. The process of claim 21 wherein the ethylbenzene production stream also contains unreacted benzene, hydrogen chloride, diethylbenzene, triethylbenzene, higher ethylated benzenes, and byproducts.

* * * * *

UNITED STATES PATENT AND TRADEMARK OFFICE
CERTIFICATE OF CORRECTION

PATENT NO. : 4,282,071

DATED : August 4, 1981

INVENTOR(S) : Fred A. Sherrod

It is certified that error appears in the above—identified patent and that said Letters Patent is hereby corrected as shown below:

On the drawing, please correct:

On Heat Exchanger C, remove the label "Heat Exchanger" and replace with ---Flash Distiller---.

Over the line number 8, insert the words ---Volatilized Portion---.

In the Specification, please change as follows:

Col. 1, line 40, change "tates" to ---tate---.

Col. 3, line 38, after the word, requires, add ---at least---.

Col. 6, line 9, correct "voaltile" to ---volatile---.

Col. 7, line 11, correct "distallating" to ---distilling---.

Signed and Sealed this

Twenty-third Day of February 1982

[SEAL]

Attest:

GERALD J. MOSSINGHOFF

Attesting Officer  Commissioner of Patents and Trademarks